Aug. 28, 1945.  E. W. REMBERT ET AL  2,383,736
APPARATUS AND METHOD FOR MOLDING FIBRO-CEMENT SHEETS
Filed Sept. 11, 1943  3 Sheets-Sheet 2
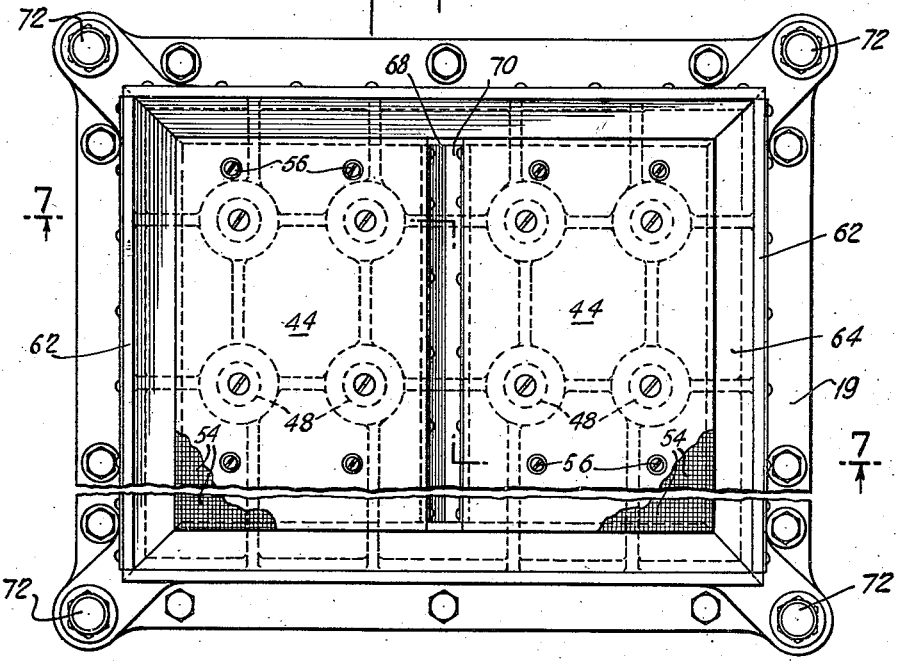
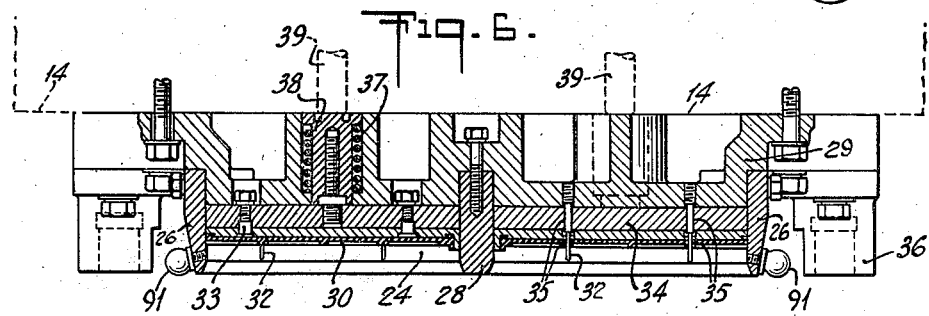
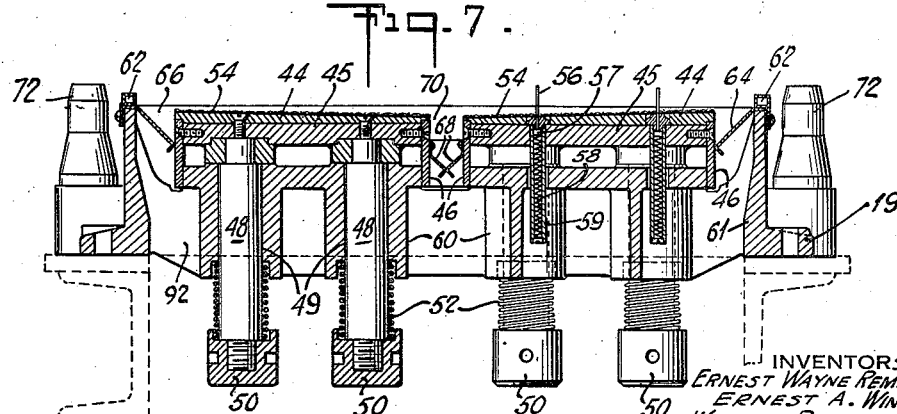
INVENTORS
ERNEST WAYNE REMBERT
ERNEST A. WINTER
WALTER REINECKER
BY
Virgil C. Kline
ATTORNEY

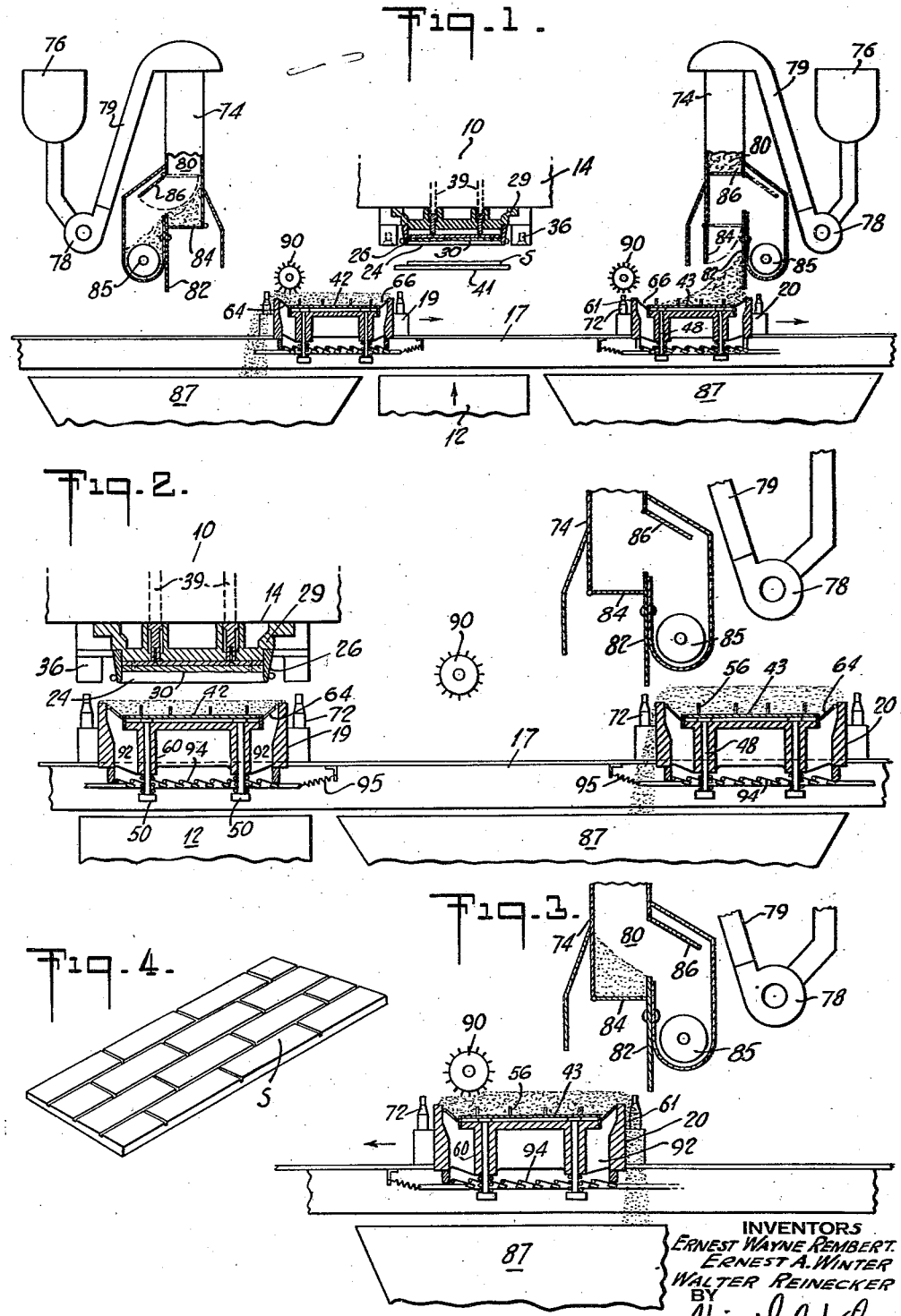

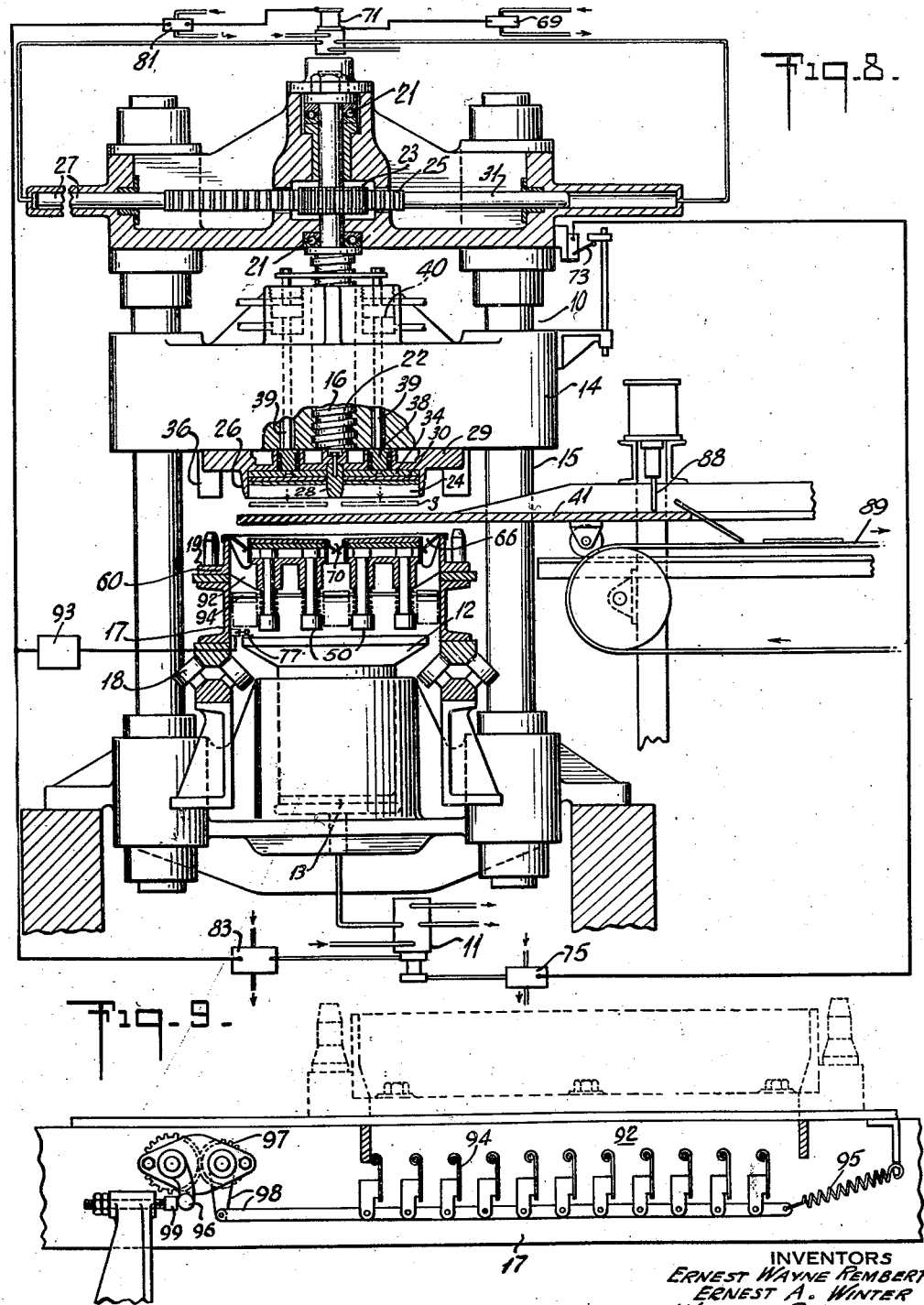

Patented Aug. 28, 1945

2,383,736

UNITED STATES PATENT OFFICE 2,383,736

APPARATUS AND METHOD FOR MOLDING FIBROCEMENT SHEETS

Ernest Wayne Rembert, Hinsdale, Ill., Ernest A. Winter, Copperhill, Tenn., and Walter Reinecker, North Plainfield, N. J., assignors to Johns-Manville Corporation, New York, N. Y., a corporation of New York Application September 11, 1943, Serial No. 502,046

18 Claims. (Cl. 25—42)

This invention relates to the manufacture of dense and hard fibro-cementitious sheets, and is particularly concerned with improved method and apparatus for manufacturing shingles and siding sheets composed largely of asbestos fibers and hydraulic cement.

The present invention is directed to improvements on the method and apparatus for manufacturing fibro-cementitious shingles and other shapes which is described and claimed in the copending application of Ernest Wayne Rembert, Serial No. 502,047, filed September 11, 1943. Certain features of the present joint invention are illustrated and described in the Rembert application, but are not claimed therein.

The invention of the aforesaid Rembert application includes as one of its principal apparatus elements an inverted cold press mold comprising an upper inverted cavity and a lower upright platform. The two elements of the mold are operatively associated with upper and lower platens of a heavy duty high speed press; and means are provided for charging the mold between press cycles with a moist, fluffed mixture of asbestos fibers and hydraulic cement. The apparatus includes a reciprocatory carriage for shifting the mold platform to one side of the press for loading between press cycles; and a resilient texture sheet of rubber or the like forming the base of the mold cavity and serving as an embossing plate and also as a stripping plate for ejecting molded shingles from the mold cavity at the end of the mold cycle.

An object of the present invention is to provide apparatus of comparatively simple and inexpensive design which is adapted for molding dense and hard fibro-cementitious sheets on a rapid and automatically controlled cycle.

A particular object is to provide improvements in process and apparatus whereby shingles and other fibro-cementitious shapes of comparatively large size may be manufactured to precise dimensions and to high strength specifications while avoiding many of the operating steps, and eliminating the trimming, time delays and material wastes, which are involved in manufacture by conventional methods.

Another object is to provide method and apparatus whereby non-free-flowing asbestos-cement mixtures incorporating only sufficient moisture to hydrate the cement may be simply and rapidly molded into shingles and siding sheets of precise dimensions and uniform structure throughout.

By employing a charge mixture of asbestos and cement which contains no excess of water above that required to hydrate the cement, a rapid molding operation is possible, avoiding material wastes and delays for removal of water. It has been found that any difficulties which are inherent in the use of a charge mixture which is not free-flowing are far outweighed by advantages in simplicity and economy in operation, and that the shingles produced by the process of the present invention are actually stronger because of more uniform distribution of components and because of a random lay or orientation of the fibers throughout the resulting structure.

A specific object of the present invention is to provide heavy duty, high speed shingle molding apparatus capable of developing the necessary high pressures and of maintaining such pressures over a suitable period of time or dwell, to effectively consolidate non-free-flowing moist mixtures of asbestos fiber and pulverulent Portland cement.

With the above and other objects and features in view, the invention consists in the improved method and apparatus for manufacturing fibro-cementitious shingles, building sheets and the like which are hereinafter described and more particularly defined by the accompanying claims.

A preferred embodiment of the invention will be described by reference to the attached illustrative drawings, in which:

Fig. 1 is a diagrammatic assembly view in longitudinal section of a preferred arrangement of apparatus suitable for practicing the process of the invention;

Fig. 2 is a diagrammatic view in longitudinal section showing parts of the apparatus of Fig. 1 in positions which they assume at a period in the operating cycle somewhat later than that portrayed in Fig. 1;

Fig. 3 is another diagrammatic view showing parts of the mold loading apparatus at a period in the operating cycle still later than that portrayed in Fig. 2;

Fig. 4 is a perspective view of an asbestos-cement siding sheet having a brick wall simulating surface pattern such as may be molded by the process and apparatus of the present invention;

Fig. 5 is a broken plan view of the platform plunger element of the shingle molding apparatus;

Fig. 6 is a detailed cross-section of the inverted mold cavity;

Fig. 7 is a detailed cross-section of the platform plunger element of the mold, taken on the line 7—7 of Fig. 5;

Fig. 8 is a press assembly view in end elevation, with parts of the mold shown in vertical section; and Fig. 9 is an elevation detail showing a row of supporting and dumping gates for excess charge material mounted on the carriage immediately below a mold charging cradle, and the actuating mechanism therefor.

In the following illustrative description of the invention, the process and apparatus will be particularly described with reference to the manufacture of asbestos-cement shingles. It will nevertheless be understood that the invention is broadly applicable to the molding of fibro-cementitious sheets or more intricate shapes in which reinforcing fibers other than asbestos, and pulverulent bonding agents other than hydraulic cements, may be employed.

As previously indicated, the apparatus which is portrayed in the drawings was designed for, and is particularly adapted to, the cold press molding of asbestos-cement shingles and sheets utilizing a moist and fluffed charge mixture comprising asbestos fibers, Portland cement and only sufficient water to hydrate the cement.

For molding asbestos-cement shingles, high pressures of the order of at least 1500-2000 lbs. per square inch are advisable. It is also desirable that such high pressures be maintained over a short period of time, or dwell, to effectively consolidate the mold charge. Hydraulic presses can be operated to develop the indicated pressure and dwell period, but the speed at which hydraulic presses can be operated is limited. In order to manufacture shinges of about 300 sq. inch size at a speed which will satisfactorily compete with conventional shingle manufacturing processes, a hydraulic press should be capable of operating at a speed of 12 to 20 cycles per minute, and of developing molding pressures of at least 600 tons while producing two shingles in each cycle.

To allow for the time and space necessary for satisfactorily charging a shingle mold in accordance with the present invention, it is necessary to limit the length of the molding cycle to a period not substantially greater than .6 second, and to operate the press with a maximum clearance between the elements of the mold of about 3½ inches. It is not practicable to provide a completely hydraulically actuated press for meeting the indicated requirements of pressure capacity, speed and dwell. The diameter of a hydraulic ram for developing 600 tons pressure should be 18", and the volume of water required to reciprocate a ram of this size over a stroke length of 3½" would be 1780 cubic inches. This volume of water would have to be moved within a period of .6 second. The largest fully automatic remotely controlled valve adapted for high pressure operation is a 2 inch valve, which would necessitate developing water speeds in the neighborhood of 140 ft. per second, which is too high for practical operation.

Referring to the drawings, 10 designates a heavy duty combination hydraulic and mechanical press provided with vertically aligned pressure applying platens. The lower press platen is a hydraulic ram 12 which is mounted in a cylinder 13 located in the base casting of the press. A main control valve 11 governs the charging and discharging of hydraulic ram cylinder 13. Any conventional ram pull-back mechanism may be used for returning the ram to its original position. The upper press platen is a press slide 14 which is slidably mounted on guide posts 15 for actuation by a rotary spindle 16. During operation spindle 16 is fixed against axial movement by anti-friction bearings 21 which permit free rotation of the spindle. Slide 14 has a female threaded bore which engages a male thread 22 on the spindle, so that rotation of the spindle causes the slide to move up or down. A spur gear 23 is keyed to spindle 16, and the teeth of this gear mesh with the teeth of a rack 25. The ends of the rack 25 are small pistons 27 and 31 which fit in hydraulic cylinders. Thus the hydraulic pistons actuate slide 14 by rotating the spindle 16.

A reciprocatory mold charging carriage 17 is slidably mounted on guide rollers 18 which are supported by the press frame. The carriage in turn mounts a pair of mold charging pallets or cradles 19, 20 which are attached to the carriage in spaced tandem relation (Fig. 1). The shaping or molding element of the apparatus consists essentially of a two part telescopic platform plunger-cavity mold or die. The mold cavity 24 is affixed in inverted position as a facing for the slide 14 of the press. Shearing knives 26 of about ½–¼ inch blade thickness are rigidly affixed in vertical depending position on the face of the mold cavity frame 29 to form rectangular mold side walls. The forward cutting edges of the shearing knives are tapered as an aid for guiding the mold, and the inner vertical faces of the knife blades which form the mold walls are dimensioned and arranged to form a tight telescopic fit with the base of the mold cavity and with the side walls of the platform plunger.

The combination mechanical-hydraulic press 10 is preferably designed for a maximum stroke of about 3½ inches. In other words, during each press cycle the combined strokes of the press slide and the ram total about 3½ inches. This total movement of the die elements is divided into two stages, one of about 2¾" and the other of about ¾". The first stage of 2¾" is performed mechanically by the press slide, to the face of which the inverted mold cavity is secured. The last high pressure stage of the mold closure is performed hydraulically by the 18 inch diameter ram, which actuates the mold plunger. The automatic control of this ram develops a maximum water velocity of about 30 ft. per second when operating the press at a rate of 20 cycles per minute.

The shinge molding unit which is illustrated has been designed for simultaneously molding two shingles or siding sheets. For this purpose the mold cavity is divided by a partition wall 28 into two identical shingle molding sections. Embossing and stripping plates 30 of resilient vulcanized rubber are movably mounted within each section of the mold cavity to form the bases of the cavity sections and to serve as top surfaces for the mold. Nail hole punching pins 32 are affixed vertically at spaced points on the lower face of the mold cavity frame 29. The embossing plates are affixed by bolts 33 to the bottom faces of plungers 34, which are in turn reciprocably mounted within the mold cavity in tight sliding engagement with the inner sides of knives 26 and partition 28. Plates 30 and plungers 34 are provided with apertures 35 aligned with pins 32 to permit these elements to reciprocate in the mold cavity without interference by the pins. Guide sockets 36 are mounted at the corners of the mold cavity frame 29 in position to register with corresponding guide pins associated with the platform plunger.

The means employed to eject a molded shingle from the mold cavity include the reciprocably mounted plungers 34 and stripping and embossing plates 30 forming the bases of the mold cavity sections. Coil springs 37 serve to hold the plungers 34 in normal tightly abutting position at the lower face of the mold cavity frame 29. Plungers 34 are in turn attached to extension pins 38 which are arranged for periodic actuation by pistons 39 of hydraulic or pneumatic pumps 40. When rods 39 are actuated to advance the plungers away from the face of the mold cavity frame 29, such movement compresses springs 37. In this operation the face of each embossing plate 30 is advanced beyond the ends of the vertical sides of the knives 26 to thereby release the formed shingle or other shape from friction engagement by the shearing knives and by partition 28 and pins 32. When the embossing plate is advanced to the position which is diagrammatically illustrated in Fig. 1 a formed shingle S is ejected from the mold. Just prior to ejection of shingle S from the mold cavity a table 41 is swung into position within the press between the mold sections to catch the shingle, which is thereafter removed by such table from the press prior to the beginning of another press operating cycle.

Two double mold plunger platforms 42 and 43 are provided, each of which has two spaced platform face plates 44 which have substantially the same area and dimensions as the embossing plates 30. Thus the platforms are designed for close telescopic sliding fit within each section of the mold cavity. The top faces of plates 44 may be disposed horizontally, or may be slightly inclined as shown in Fig. 7 for molding a tapered shingle or sheathing slab. Each platform plunger section 45 is provided with vertical side walls 46, and is movably mounted on the frame of one of the mold charging cradles 19 or 20. Each platform plunger is provided with depending cylindrical extension pins 48 which are slidably journaled in bores 49 within the cradle frame. Each of the extension pins 48 is provided with a cap 50. These caps form supporting elements for coil springs 52. Platform plungers 45, together with their depending extension pins 48, are mounted as reciprocable mold plunger elements which are journaled on the carriage cradles 19 and 20 and which are periodically engaged and lifted away from a cradle (against the compression force of springs 52) by the lower press piston 12. Each plunger face is preferably covered by a wire screen 54 having a mesh no coarser than 40 x 40 to the inch and serving as an air venting nonadherent surface for the press mold. Such screen has sufficient depth and porosity to bleed off any air squeezed out of the mixture during the press molding cycle, while at the same time being of sufficiently fine mesh to prevent escape of charge solids from the mold through the screen pores. Nail hole forming pins 56 are retractably supported vertically at the faces of the plungers 45 by means of pistons 57, which are in turn retractably supported in cylinders 58 by coil springs 59.

Vulcanized rubber which is resilient and not too hard affords an exceptionally suitable material for use as an embossing or texture sheet. Such rubber texture sheets can be molded to conform closely to the surface irregularities of a deeply grained wood surface or of a brick wall which is to be reproduced. Heretofore, such rubber texture sheets could not be used in conventional equipment for manufacturing hard and dense asbestos cement shapes because they deformed too easily under the high pressures which are employed. In the shingle molding apparatus of the present invention such rubber texture sheets or equivalent rubber substitute material are preferably employed as base plates for the mold cavity. Suitable results have been obtained with rubber texture sheets ranging in hardness from 60–80% of the hardness of hard vulcanized rubber. Use of such rubber texture sheets is permitted by the fact that the walls of the mold cavity are designed to closely confine the rubber sheets against lateral expansion under the heavy molding pressure. An additional advantage of using such rubber texture sheets is that they provide non-adherent surfaces to which moist compressed asbestos cement shingles do not adhere, so that the formed shingles can be readily loosened and ejected from the mold. Even when confined the surface of the texture sheet spreads slightly under the high molding pressure, and release of pressure on the sheet effects some lateral contraction of the face projections, thereby eliminating any tendency of the rubber sheet to adhere to the wet molded shape.

The nail hole forming pins 56 are mounted on the top surface of the plunger platform to develop nail hole cavities in the layer of charged material which is introduced to the mold. Such pins are provided with retractable mountings within the body of the platform so that they may be displaced into the mounting bores against the tension of springs 59 during the molding operation. It is desirable that such pins be retractable below the platform surface in order to prevent any possibility of the compressed moist shingle sticking to such pins and binding to the platform surface during the molding operation. The pins 32 at the face of the embossing plate are positioned in direct vertical register with pins 56 for the specific purpose of displacing pins 56 downwardly below the level of the plunger platform face during the molding cycle.

Each of the cradles 19 and 20 which are spacedly mounted on the carriage, consists essentially of a frame 60 which is bolted to carriage 17 and which supports and journals two of the plungers 45. Each of the cradles is provided with upstanding side walls 61 arranged in the form of a rectangle in spaced relation with respect to the vertical side walls of plungers 45. The tops of cradle walls 61 extend upwardly above the tops of plunger facing plates 44 and are capped by clamping elements 62. Spring steel sheet closure elements 64 are hingedly clamped by elements 62 in position to form displaceable bottoms for charge collecting and charge supporting troughs 66 which entirely surround platforms 42 and 43. Other spring steel plates 68 are shown as hingedly bolted to the cradle frame in position to form charge supporting elements at the base of a central trough 70, located between the plungers 45. At the corners of cradles 19 and 20 guide pins 72 are mounted, and these guide pins are dimensioned and positioned to register with the guide sockets 36 at the corners of the mold cavity during periods when the mold elements are aligned between the press pistons.

The horizontal spacing of the cradles 19 and 20 equals the throw of the carriage, or in other words the maximum distance that the carriage travels in one direction. In Fig. 2, the cradle 19 is shown in vertically aligned position with the press platens 12 and 14, and at the same time cradle 20 is shown as having reached the end of its path of travel to the right. In Fig. 1 the cradle 20 is shown at the charge receiving position immediately beneath one of a pair of charge measuring and loading elements 74. The apparatus includes two charge measuring and loading elements 74 which are mounted respectively at opposite sides of the press 10 immediately above the reciprocation path of the carriage 17.

In manufacturing hard and dense shingles or slabs in accordance with the present invention, asbestos fibers and Portland cement may be used in the proportions that are conventional for this purpose. The asbestos fibers may be of shingle grade quality and fiber length, as for example, Canadian chrysotile fibers of which 4–6 ounces are retained on a standard 4 mesh screen, 9–11 ounces retained on a 10 mesh screen and about 1 ounce passes through a 10 mesh screen, when testing a 16 ounce sample by the Standard Quebec Wet Screen method. In the following specific example, finely-divided silica is incorporated in the charge mixture to develop maximum strength.

In operation, a dry charge mixture containing, for example, 30–40% by weight of asbestos fibers, 35–45% hydraulic cement and 20–30% finely-divided silica may be formed by thorough mixing in a rotary paddle type mixer 76. After mixing the pulverulent ingredients in a dry state, water is added in amount just sufficient to combine with the hydraulic cement, and the mixture is then agitated to effect uniform moistening of the materials. During these mixing operations the paddles within the mixer are preferably rotated at a high speed of, for example, 150 R. P. M., and the dry mixing operation may occupy a period of 2 to 3 minutes. The amount of water which is added to the dry mixture usually approximates about 40% by weight of the hydraulic cement, and the addition of water is preferably effected by means of sprays. After a further wet mixing operation of about 5 minutes in mixer 76, the moist fiber-cement mixture is introduced into a fan 78, whereby the mixture is fluffed and picked up by a carrier air stream for delivery by means of a pneumatic conveyor 79 into a feed chamber 80. The bottom of chamber 80 is provided with a vertically adjustable partition plate 82, and with a pivotally mounted charge supporting and discharging gate 84. As charge material enters the top of chamber 80 it drops onto the top surface of hinged shelf gate 84 and builds up thereon at its natural angle of repose (about 45°) to a level which is limited by adjusting the height of the upper edge of plate 82. Any excess material which is delivered to chamber 80 overflows the top of plate 82 and is picked up and returned to mixer 76 by a conveyor 85.

When an empty mold platform 43 and its supporting cradle 20 moves into position below one of the charging gates 84 (see Fig. 1) the gate is automatically swung downwardly, thereby dumping a measured charge of the fluffed mixture (of about 0.5 gm./cc. density) onto one end of the platform and into that portion of the surrounding trough 66 at the right of platform 43. At the same time that gate 84 opens, an upper gate 86 is swung into temporary closed position across the bottom of chamber 80 to catch material falling into chamber 80 during the period of charging platform 43. After a measured charge of material has been dumped on the platform plunger, gates 84 and 86 swing back to their original positions, (Fig. 2) and carriage 17 continues to move the cradle 20 to the right as viewed in Fig. 1. During this movement the charge material on the cradle and platform is levelled in a preliminary way by the raking action of the lower edge of plate 82. At the end of this charge leveling operation, when the cradle 20 has been moved to the end of its path of travel to the right (see Fig. 2), the charge material on the platform 43 and the cradle 20 has been spread out in a layer over the top of the platform, and any excess material has been unloaded over the edges of the cradle into a bin 87 from which it is returned to the mixer 76.

During this period of charging and initially leveling the charge on the right hand platform 43, the other previously loaded platform 42 has been shifted from a charge leveling position shown in Fig. 1, to a position immediately below the mold cavity and between the press platens (as shown in Fig. 2). When one of the loaded platform plungers arrives at a position such as illustrated in Fig. 2 in vertical alignment between the press platens, the reciprocatory movement of the carriage 17 is temporarily arrested while the press platens are advanced toward each other, thereby applying high pressure to the charge material as the mold cavity 24 is lowered and the platform 42 is raised to bring the cavity and platform into closely fitting telescopic engagement. This molding operation requires no more than a fraction of a second for its completion, after which platens 12 and 14 are again separated and the thus emptied platform 42 and cradle 19 thereby released for movement to the left for recharging beneath the left hand charging element 74. As soon as the platen 14 has been raised to approximately the top limit of its upward stroke, shingle ejection mechanism including piston rods 39 operate to advance the plates 30 and 34 within the mold cavity to a position at the outward edge of the cavity, as portrayed in Fig. 1, at which position a formed shingle S is ejected from each mold cavity and caught on table 41. Table 41 thereafter withdraws (Fig. 8) to remove the shingles from the press preliminary to the commencement of another molding cycle. As the table again moves into the press, a plunger 88 operates to remove the shingles from the table onto a conveyor 89.

As carriage 17 moves toward the left from the position shown in Fig. 2, the right hand platform 43 again advances beneath the lower edge of plate 82. A rotary picker roll 90 is shown as positioned to the left of plate 82 in the direction of travel of platform 43 toward the press, and reliance is placed on this picker roll, rotating at high speed, to further level off the charge on the mold platform to a layer of predetermined thickness (for example ¾"–1"), to thereby insure that a charge of uniform volume enters the mold for each molding operation.

At the beginning of a molding operation the inside edges of shearing knives 26 advance into close sliding engagement with the vertical edges of lower platforms 45, and at the same time the edges of partition 28 advance into tight sliding engagement with the vertical walls of central trough 70. During this operation the layer of charge material on each of the platform faces 44 is cleanly cut through, and the flexible spring bottoms of troughs 66 and 70 are displaced downwardly by contact with the lower edges, respectively, of knives 26 and partition 28. One or more spherical head screws 91 may be affixed to the outside forward edge of each shearing knife 26 to insure full opening of plates 64 during the mold closing operation. In this way excess charge material empties from the troughs into chambers 92 located within the bases of the cradles 19 and 20. The excess charge material thus emptied into chambers 92 is retained on dump gate closures 94 forming the bases of such chambers 92, until such time as the molding operation is completed and the cradle has again been moved to a position approaching its charging position. When this position is reached, the gates 94 are swung open (Fig. 9) against the tension of spring 95 by trip lever 96 acting through gears 97 and crank 98, to empty any charge material into recycling bins 87.

The final operation in the manufacture of asbestos-cement shingles or siding sheets involves a preliminary cure of the compressed sheet to develop an initial set. To develop maximum strength, it is desirable to keep the shape in a moist condition during the initial set. Maximum strengths are developed by finally curing shingles or sheets made from mixtures containing finely-divided silica in an atmosphere of steam under approximately 100 lbs. pressure over a period of about 24 hours. Shapes thus produced develop a dry density of 110–120 lbs. per cubic ft. and a modulus of rupture of at least approximately 4000 lbs. per square inch. Using the particular press illustrated, two 11″ x 28″ tapered siding sheets of ¼″–⅜″ butt thickness tapering to ⅛″–³⁄₁₆″, can be produced per mold cycle, and the press can be operated at a speed of 12–20 cycles per minute.

Other hydraulic cements, as for example, lime and comminuted diatomaceous earth, may be substituted for the Portland cement. Mixtures consisting of asbestos and Portland cement without finely-divided silica may be used in molding dense and hard shingles which are cured by allowing to stand for about a day at normal room temperatures, during which period the cement takes its initial set. The final set is then developed by long standing at atmospheric or elevated temperature. The proportion of asbestos and cement may be varied within a suitable range of, say, 50–100% of asbestos on the weight of the Portland cement.

By electric and pneumatic control mechanism the press and carriage can be operated to complete a cycle in a period of three to five seconds. Assume that a cycle is initiated by moving a charge filled mold plunger platform into the press. While the carriage is moving a mold charge into the press, a cam follower which is mounted on the carriage acts to trip a lever which in turn actuates air cylinders or other suitable mechanism whereby to open a lower charging gate 84, thus dumping a charge mixture onto the top of an empty mold plunger platform. The opening of this lower charging gate acts through another lever to simultaneously close temporarily an upper charge control gate 86, and time delay mechanism is simultaneously set in motion to close the lower charging gate and simultaneously open the upper gate after a short charging interval of say ¹⁄₁₀ of a second.

As the carriage moves a charge filled mold platform and pallet into molding position in the press, a limit switch is tripped, which in turn actuates a solenoid pilot valve 69. Pilot valve 69 controls the operation of main valve 71, which operates to charge the hydraulic cylinder for actuating piston 31, thus moving press slide 14 downwardly by turning spindle 16. Near the end of movement of the press slide downwardly a limit switch 73 is tripped, which in turn energizes a solenoid pilot valve 75. Solenoid valve 75 controls the operation of main valve 11, thus actuating the lower hydraulic ram of the press and causing the ram to move upwardly to develop the maximum press loading pressure. Caps 50 on pins 48 projecting downwardly from the bases of the mold platforms, are contacted by the ram as it moves upwardly. Thus, the mold platforms are forced into the mold cavity sections without subjecting any portion of the supporting pallets 19 or 20 to high press loading pressures. Also, in this method of operation, none of the parts of the mold cavity or press slide actuating mechanism are under press loading pressure while moving. The last fraction of the upward movement of the ram 12 trips a limit switch 77, which in turn actuates pilot valves 81 and 83. These two valves in turn control the operation of main valve 71 and 11, which operate simultaneously to reverse the direction of motion of the press slide and ram to thereby bring the press back to its original open position preliminary to commencing of a new operating cycle. A time delay relay 93 is used to insure a short period (at least about 0.1 second) of dwell of the press in closed high pressure position, to effect maximum consolidation and densification of the mold charge.

At the end of the upward movement of the press slide another adjustable lever or switch functions to actuate electric or pneumatic mechanism whereby shingle receiving table 41 is moved into position within the press. As the shingle receiving table moves into position it actuates a switch dog or lever whereby pneumatic air cylinders 40 mounted on the press slide are placed in operation. The pistons and piston rods of the air cylinders are operatively connected with the mold stripping plate, and downward movement of the stripping plate effects discharge of the shinges from the mold cavity onto the shingle receiving table. When the stripping plate has reached the lower limit of its downward movement in the mold cavity, a tripping element on the stripping plate functions through electric or pneumatic air control mechanism to reverse the piston movements in the air cylinders, which in turn operate in cooperation with springs 37 to return the shingle stripping plate to its normal position at the base of the mold cavity. This same control operates to withdraw the shingle receiving table from the press. As soon as the shingle receiving table has been withdrawn from the press, a switch dog or lever mounted thereon engages electric or pneumatic switching mechanism thereby initiating movement of the mold carriage in the opposite direction on another mold cycle. Other stops 99 in the path of the carriage periodically engage levers to thereby effect opening of the shaft mounted gates 94 at the base of the carriage, thus permitting discharge of excess charge material from carriage chamber 92 into the bins 87 from which the material is returned to the charge mixer 76.

To insure that the mold corners and edges are completely filled, and to prevent dragging and binding of the charge material around the edges of the mold, the layer of charge material on the mold plunger platform is supported against lateral displacement up to the time that it enters the mold cavity, by excess charge material which is carried in a shallow trough 66 supported by the charging pallet and entirely surrounds the plunger platform.

Since dry or moist materials containing asbestos fibers do not flow freely even under high pressure, it is very necessary to develop uniform distribution of the material throughout the mold before pressing and densifying the material to final shape. The preliminary operation of fluffing the charge material eliminates the presence of lumps which would otherwise be formed in the primary mixing of water with the cement, and also insures accurate measurement of a mold charge and a uniform density throughout the formed shape. A fluffed mixture is also much easier to cut transversely along the edges of the mold platform by the shearing knives, because of the absence of any appreciable proportion of moistened cement lumps. Experience has shown that sheets or shingles produced from a charge mixture which has been previously fluffed have 5-10% higher strength or modulus of rupture as compared to sheets produced from an unfluffed mixture.

It has been found that shingles or sheets of the previously indicated composition and dimensions and having a modulus of rupture of approximately 3500-4500 lbs. per square inch can be molded under 1500-2000 lbs. per square inch pressure. Such shingles do not, of course, have their full strength until after they have been cured following completion of the molding operation. However, at the end of the molding operation the shingles have ample strength to withstand normal handling without breakage or distortion. Manufacture of hand and dense fibro-cementitious shapes in the apparatus described is economical because of the small number of operations required and because of the high output capacity of the press and the elimination of material waste.

Since many variations may be made from the illustrative details given, without departing from the scope of the invention, it is intended that the invention should be limited only by the terms of the claims interpreted as broadly as consistent with novelty over the prior art.

What we claim is:

1. A method of molding a moist, fluffed fiber-cement mixture which comprises, depositing and leveling a measured volume of said mixture in a layer on a raised platform surface, laterally supporting said layer of material by means of excess material surrounding said layer, transversely shearing said layer to the peripheral dimensions of said platform, compressing the retained layer of material between the platform and an inverted mold cavity to a pressure of at least 1500-2000 lbs. per square inch as a continuation of said shearing operation, and holding said layer material under said maximum pressure for a dwell period of at least about 0.1 second to effectively consolidate and densify the mold charge.

2. In producing hard and dense fibro-cementitious sheets the steps comprising, depositing a measured volume of moist, fluffed asbestos fiber-cement mixture on the top surface of a raised platform, leveling the material in a layer of predetermined thickness over the platform, laterally supporting said layer material by maintaining excess material surrounding said layer, transversely shearing said layer to the peripheral dimensions of the platform, restraining the layer of material against lateral displacement while compressing the layer between the platform and a resilient rubber texture plate under a pressure of at least 1500-2000 lbs. per square inch, and holding said layer material under said maximum pressure for a dwell period of at least about 0.1 second to effectively consolidate and densify the mold charge.

3. A method of producing dense and hard asbestos-cement sheets which comprises, distributing a non-free-flowing mixture of shingle grade asbestos fibers, pulverulent hydraulic cement and sufficient water to hydrate the cement on the top surface of a raised platform, leveling the material over the platform in a layer of predetermined thickness, restraining the layer material against lateral displacement while high pressure molding the layer between the platform and a resilient rubber texture plate, holding said layer material under said maximum pressure for a dwell period of at least about 0.1 second to effectively consolidate and densify the mold charge, ejecting the formed shape from the mold, and curing the shape to effect complete hydration and setting of the cement.

4. The method of manufacturing hard fibro-cementitious sheets as defined in claim 3, including the steps of embossing a pattern on a face of the compressed shape in contact with the texture plate as a part of the compressing operation, and loosening the wet densified shape from the texture plate by release of pressure.

5. The method of manufacturing hard fibro-cementitious sheets as defined in claim 2, including the step of initiating recycling of excess charge material surrounding said retained layer during the compression stroke.

6. Apparatus adapted for molding dense and hard asbestos-cement sheets comprising, a heavy duty, high speed press having vertically aligned pressure applying platens, telescopically fitting inverted mold cavity and upright mold plunger platform elements operatively connected respectively with the upper and lower press platens, means for distributing a mold charge in a layer of predetermined thickness over the top surface of said plunger platform, a resilient rubber texture plate forming the base of the mold cavity, and shearing knives forming the walls of the mold cavity and arranged in closely confining and tight fitting engagement with the texture plate and platform sides.

7. Apparatus adapted for molding dense and hard asbestos-cement sheets comprising, a heavy duty high speed press having vertically aligned pressure applying platens, telescopically fitting inverted mold cavity and upright mold plunger platform elements operatively connected respectively with the upper and lower press platens, means for distributing a mold charge in a layer of predetermined thickness over the top surface of said plunger platform, a trough for supporting excess charge material around the layer of material on the platform surface, shearing knives forming the walls of the mold cavity and arranged in closely confining and tight fitting engagement with the platform sides, and means forming a part of said trough and arranged for periodic actuation by the shearing knives during the molding cycle to initiate recycling of the excess charge material.

8. Apparatus adapted for molding dense and hard asbestos-cement sheets comprising, a heavy duty high speed press having vertically aligned pressure applying platens, telescopically fitting inverted mold cavity and upright mold plunger elements operatively connected respectively with the upper and lower press platens, a carriage guided for reciprocatory movement transversely to said press platens, a charge receiving pallet mounted on said carriage and having a central bore forming a journal mounting for said mold plunger platform, and means for distributing a mold charge in a layer of predetermined thickness over the top surface of said plunger platform.

9. Molding apparatus as defined in claim 6, including nail hole punching pins mounted at the base of the mold cavity, and means for reciprocating the texture plate within the mold cavity whereby to eject a molded sheet from the cavity.

10. In apparatus adapted for molding hard and dense fibro-cementitious sheets, a heavy duty high speed press, said press having spaced aligned press platens, mechanical means for reciprocating one press platen in a path of some length, hydraulic means for reciprocating the other press platen through a relatively short path, and telescopically fitting mold cavity and mold plunger elements, said mold cavity being mounted in inverted position for actuation by one press platen, and said mold plunger being mounted in upright position for actuation by the other press platen.

11. Apparatus for molding fibro-cementitious sheets as defined in claim 10, including automatic controls for said mechanical and hydraulic platen actuating means, said controls being synchronized to operate said platens in successive sequence on the forward strokes and simultaneously on the return strokes, with a dwell period between the forward and return strokes.

12. Apparatus for molding fibro-cementitious sheets as defined in claim 10, including a carriage guided for reciprocatory movement transversely to said platens, and a charge receiving and transporting pallet mounted on said carriage, said mold plunger having an elevated platform top centrally mounted on the pallet and journaled for periodic reciprocation by the other press platen.

13. Apparatus adapted for molding hard fibro-cementitious sheets as defined in claim 10, including mechanism operable between movement cycles of the press platens for distributing a charge layer of predetermined thickness over the mold platform in position to be compressed between the platform and mold cavity by movement of the press platens on forward strokes.

14. Apparatus adapted for molding hard fibro-cementitious sheets as defined in claim 10, including a resilient rubber texture plate forming the base of the mold cavity and confined by the mold side walls against lateral expansion.

15. Apparatus adapted for molding dense and hard asbestos-cement sheets comprising, a heavy duty high speed press having two vertically aligned reciprocable pressure applying platens, telescopically fitting inverted mold cavity and plunger platform elements operatively connected respectively with the upper and lower press platens, shearing knives forming the walls of the mold cavity, nail hole punching pins mounted on the mold cavity and a resilient rubber texture plate forming the base of the mold cavity and relatively movable with respect to the shearing knives and nail hole punching pins.

16. Apparatus adapted for molding asbestos-cement sheets as defined in claim 15, including nail hole forming pins retractably supported at the surface of the plunger platform in register with the nail hole punching pins of the mold cavity.

17. Apparatus adapted for molding asbestos-cement sheets as defined in claim 15, including means for depositing and leveling a charge layer of predetermined thickness over the top surface of said plunger platform, and means for supporting excess charge material around the layer of material on the platform surface in amount sufficient to restrain said charge layer against lateral displacement up to the time that it enters the mold cavity.

18. Apparatus adapted for molding dense and hard asbestos-cement sheets comprising, a heavy duty high speed press having two vertically aligned reciprocable pressure applying platens, telescopically fitting inverted mold cavity and plunger platform elements operatively connected respectively with the upper and lower press platens, shearing knives forming the walls of the mold cavity, a resilient rubber texture plate forming the base of the mold cavity, a carriage guided for reciprocatory movement transversely to said press platens, two charge receiving and transporting pallets mounted in spaced tandem relation on said carriage, and a second mold plunger platform, said mold plunger platforms being movably mounted on the pallets for period alternative actuation by the carriage and by the lower press platen.

ERNEST WAYNE REMBERT.
ERNEST A. WINTER.
WALTER REINECKER.